Mar. 20, 1923. 1,449,305.
E. H. SNYDER.
APPARATUS FOR TEACHING TELEGRAPHY.
FILED JULY 15, 1921. 2 SHEETS—SHEET 2.
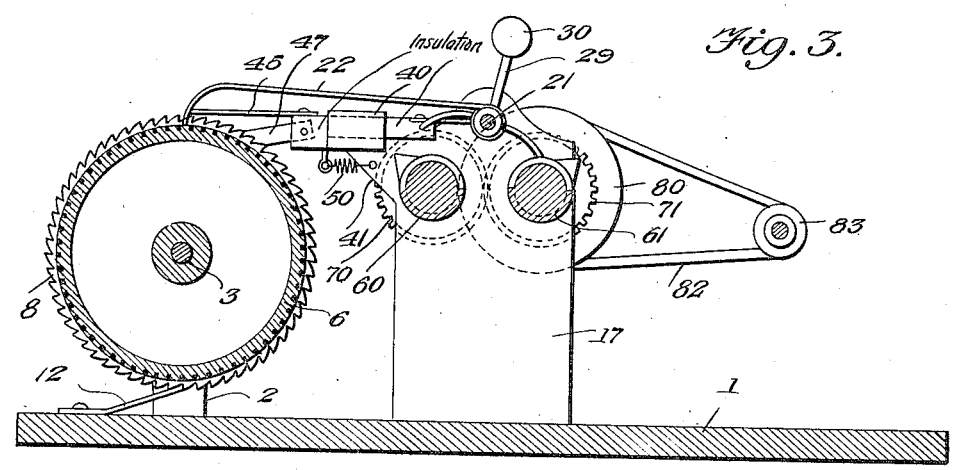
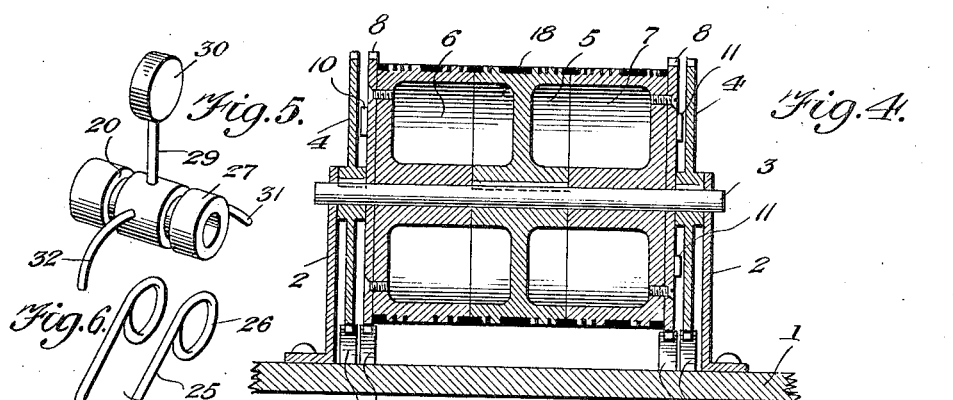
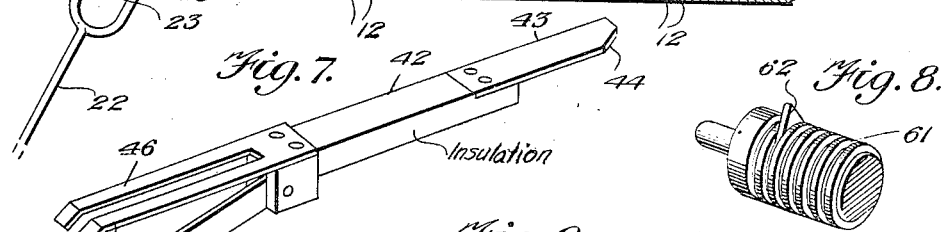
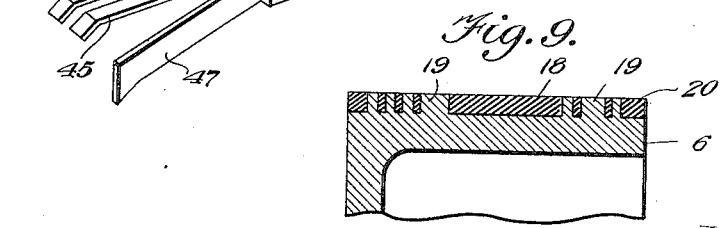
E. H. Snyder
INVENTOR
BY Victor J. Evans
ATTORNEY Patented Mar. 20, 1923.

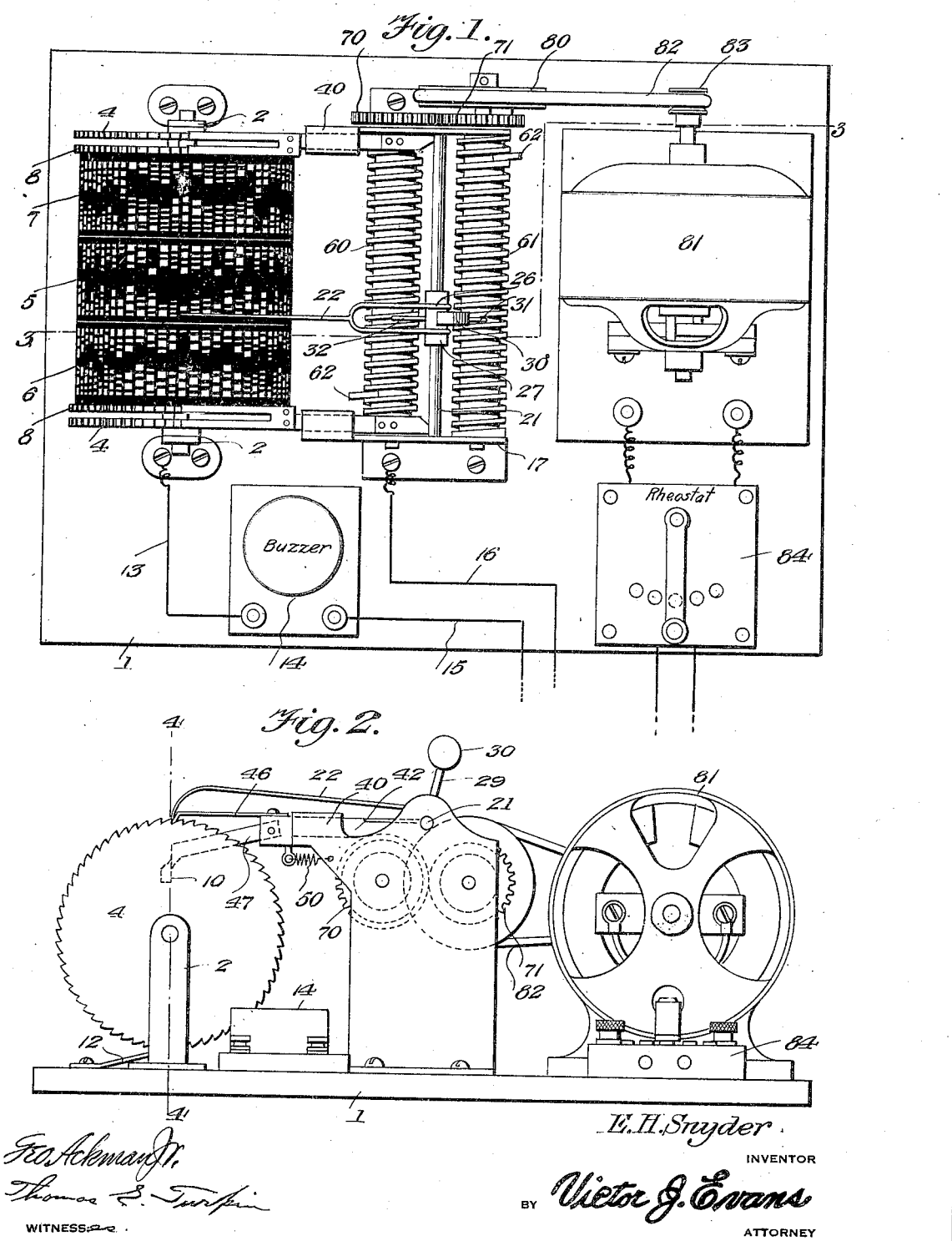

1,449,305

UNITED STATES PATENT OFFICE.

EDWARD H. SNYDER, OF BALTIMORE, MARYLAND.

APPARATUS FOR TEACHING TELEGRAPHY.

Application filed July 15, 1921. Serial No. 484,953.

*To all whom it may concern:*

Be it known that I, EDWARD H. SNYDER, a citizen of the United States, residing at Baltimore, in the county of Baltimore City and State of Maryland, have invented new and useful Improvements in Apparatus for Teaching Telegraphy, of which the following is a specification.

The object of my present invention is the provision of a sounding apparatus for teaching telegraphy, characterized by the capacity to furnish an extremely large vocabulary in proportion to the size of the apparatus, and by the capacity to keep the listening student on the qui vive—i. e., to prevent him from assuming, after certain completions of the circuit, that a particular signal will follow, this with a view to avoid the student becoming careless or list-less while receiving.

To the attainment of the foregoing, the invention consists in the improvement as hereinafter described and definitely claimed.

In the accompanying drawings, forming part of this specification:—

Figure 1 is a plan view of the best practical embodiment of my invention that I have as yet devised.

Figure 2 is a side elevation of the same.

Figure 3 is a longitudinal vertical section on the line 3—3 of Figure 1.

Figure 4 is a transverse section taken in the plane indicated by the line 4—4 of Figure 2.

Figure 5 is a detail perspective of the rocking member through the medium of which the laterally movable terminal is moved and through the medium of which the direction of movement of said terminal is automatically reversed.

Figure 6 is a detail perspective of the portion of the laterally movable terminal that is connected to the rocking member.

Figure 7 is a detail perspective of one of the endwise movable detents for cooperation with code bearing cylinders.

Figure 8 is a sectional perspective showing one end of one of the spirally threaded shafts and also showing the cam taper on said shaft.

Figure 9 is an enlarged detail diametrical section taken through one of the code bearing cylinders.

Similar numerals of reference designate corresponding parts in all of the views of the drawings.

Among other elements my novel apparatus comprises an appropriate base 1 on which are standards 2. Journaled in the said standards 2 is a transverse shaft 3, and keyed or otherwise fixed to the said shaft 3 are ratchet disks 4. By particular reference to Figure 4 it will be observed that a code bearing cylinder 5 is keyed or otherwise fixed to the shaft 3, and that said cylinder 5 is interposed between and movable independently of code bearing cylinders 6 and 7 which are loose on the shaft 3. Each of the said cylinders 6 and 7 is provided at its outer side with a ratchet disk 8, the said ratchet disks 8 being arranged in parallelism to the before mentioned ratchet disks 4. It will also be observed that one of the disks 8 is provided at its outer side with a lateral abutment 10, and the other disk 8 is provided at its opposite side with diametrically opposite lateral abutments 11. At 12, Figure 4, are spring pawls adapted to prevent retrograde movement and too free forward movement of the disks 4 and 8. The major portion of each of the cylinders 5, 6 and 7, Figure 1, is of metal or other appropriate conductive material as is the shaft 3 and one of the standards 2, to which standard 2 is electrically connected at wire 13 which is comprised in a normally open circuit with a buzzer 14, for instance, a wire 15, a source of electric energy (not shown), and a wire 16, the said wire 16 being connected to one of a pair of standards 17 the particular standard mentioned being of metal or other conductive material. By the use of insulation, designated by 18, or by any other appropriate means the peripheral portions of the cylinders 5, 6, and 7 are provided into circuit making portions designated by 19 in Figure 9, and circuit breaking portions designated by 20, the former portions being preferably integral with the cylinders, the latter being formed by insulation 18, and the said portions 19 and 20 being arranged in series extending lengthwise of the cylinders at the peripheries thereof to form cipher words.

Carried by and extending between the standards 17 Figure 4, is a rod 21 of circular form in cross section, said rod 21 being of conductive material and electrically connected with the particular standard 17 to which the wire 16 extends.

At 22 is the laterally movable terminal of the apparatus for cooperation with the peripheral portions of the cylinders 5, 6 and 7. The rear portion of the said terminal 22 is bifurcated as indicated by 23, and the extremities of the arms 25 of the bifurcation are shaped into eyes 26 as best shown in Figure 6. The forward end of the terminal 22 is adapted to slide on the peripheries of the cylinders 5, 6 and 7 in the direction of the length of said cylinders, and therefore the said end is preferably convex in the direction of the length of the cylinders so as to assure the terminal sliding smoothly over the circuit making and breaking portions of the cylinders and also over the joints between the contiguous ends of the cylinders.

Mounted to rock on and move endwise of the transverse rod 21 is the rocking member of the apparatus which member is best shown in Figures 3 and 5. The said rocking member comprises a sleeve 27, which loosely receives the rod 21 and is circumferentially grooved at 20 to seat the eyes 26 of the terminal 22, an arm 29 extending radially from said sleeve 27 and weighted at 30, an arm 31 extending rearwardly from the sleeve 27, and an arm 32 extending forwardly from the sleeve 27.

Guided in horizontally disposed sleeves 40 carried on extensions 41 of the standards 17 are the body portions 42 of lengthwise movable detents which are best shown in Figure 7. In addition to the body portion 42 each of the said endwise movable detents comprises a rearwardly extending bar 43 the inner end portion of which is beveled as designated by 44, pawls 45 and 46 fixed to and extending forwardly from the body 42 and having terminal portion adapted to engage the teeth of ratchet disks 4 and 8, respectively, and a pawl 47 extending forwardly from the body 42 in a plane below the pawls 45 and 46 and adapted to engage the lateral lug or lugs on one of the disks 8. The endwise movable detents described are retracted or moved endwise through the medium of retractile springs 50, one of which is shown in Figure 3 and the other in Figure 2.

At the end of each traverse of the rocking and endwise movable member on the rod 21 one slightly-beveled end of the sleeve 27 of said member acts against the bevel 44 of one of the endwise movable detents with the result that the said detent is moved positively forward whereupon its pawls 46 and 45 by cooperation with the presented disks 4 and 8 will move the adjacent end cylinder and the intermediate cylinder the distance of one tooth. Likewise when one of the lateral lugs on the end cylinders is presented to the pawl 47 of the detent that is positively moved endwise as stated, the end cylinder will be moved or turned a distance considerably greater than one tooth, this because of the arrangement of the lateral lug at an intermediate point between the center and the periphery of the disk 8 on which it is carried. It will also be noted here that because one of the disks 8 being provided with two lateral lugs 11 the said disk 8 and the cylinder 7 to which it is connected will be moved or turned and comparatively long distance more frequently than the other disk 8 and the cylinder 6 to which it is directly connected. Manifestly the described step by step turning of the cylinders 5, 6 and 7 at intervals during the operation of the apparatus will have the effect of changing the combinations of the circuit making and breaking portions on the several cylinders with the result that the vocabulary of the apparatus will be greatly increased, and at the same time the listening student will be compelled to always keep on the alert as the combinations are constantly changing he will not be able to anticipate the signal that is going to follow a certain series of signals.

Journaled in the standards 17 and arranged in parallelism are correspondingly threaded transverse shafts 60 and 61 each of which is provided near one end with a radially projecting cam tappet 62. With the parts positioned as shown in Figure 1 and the apparatus in operation, the arm 31 of the rocking and endwise movable member will by the thread of the shaft 61 be moved toward the cam tappet 62 on the said shaft 61, and the terminal 22 will be moved in the same direction and endwise on the cylinders 5, 6 and 7, the free end of the said terminal 22 being held in gravitational contact with the said cylinders or with one cylinder at a time. When the rocking and endwise movable member reaches a position adjacent to the cam tappet 62 of shaft 61 the said cam tappet by cooperation with the arm 31 will rock the member so as to put the arm 32 of the member in engagement with the thread of the shaft 60, whereupon the member will be reversely moved endwise on the transverse rod 21. Before this operation takes place, however, the rocking and sliding member by cooperation with the adjacent endwise movable detent will have moved the said detent forwardly against action of its spring 50 in the manner and for the purpose before described. When the endwise movable and rocking member is moved by the cooperation of the arm 32 with the shaft 60, the said member as it approaches the end of that traverse will cooperate with the adjacent endwise movable detent to move the said detent endwise forwardly, and immediately thereafter the cam tappet 62 of the shaft 60 by cooperation with the arm 32 will rock the member so as to replace the arm 31 in engagement with the thread of the shaft 61 when the member and the terminal 22 will again be moved toward the cam tappet 62 of the threaded shaft 61.

Intermeshed spur gears 70 and 71 are fixed to the shafts 60 and 61, respectively, so that when one of the shafts, preferably the shaft 61 is rotated, the other shaft will be rotated in reverse direction. It is within the purview of my invention to rotate the shaft 61 manually or by any appropriate motor. I prefer, however, to provide the said shaft 61 with a pulley 80 and to rotate the same through the medium of an electric motor 81 on the base 1, and a band 82 mounted on the said pulley 80 and connecting the said pulley with a pulley 83 on the armature shaft of the motor, and I also prefer to provide on the base 1 a rheostat 84 through the medium of which the listening student may conveniently increase or diminish the speed of rotation of the shafts 60 and 61.

It will be apparent from the foregoing that notwithstanding the compactness of my novel apparatus, the same in virtue of the construction described is adapted to provide a very large vocabulary of cipher words and to present such words in such varying sequence as to keep the listening student at all times on the alert with the result that the student will become proficient more quickly than when he employs apparatus such as at present in vogue.

Because of its ratchet disk 8 being equipped with a plurality of lugs, the cylinder 7 will be moved a comparatively great distance more frequently than the cylinder 6, and in that way the vocabulary of the cipher words will be further increased.

All the telegraphic characters of the wireless alphabet except three C, J and Z will reverse, that is reading either from left to right or right to left they will make some telegraphic character as : .— —. . . read from left to right would make AB, read from right to left it would be VN. By leaving the three letters named off the outside disks and placing them frequently on the center disk in order that each letter appears on the machine about the same number of times, the capacity of the machine, in number of words is exactly doubled, as each of the end letters are sent from left to right and from right to left on each movement of the ratchet wheel, or disk.

The term "sounder" as herein employed is intended to comprehend a buzzer or any other audible electric signal.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters Patent, is:—

1. The combination of a cylinder bearing longitudinal sets of circuit making and breaking portions, a terminal in contact with and movable lengthwise of said cylinder, means for including said cylinder and terminal in a circuit with a source of electric energy and a sounder, screw shafts connected and rotatable in opposite directions, cam-tappets on said shafts near ends thereof, and an endwise movable and rockable member to move the terminal, said member actuatable first by the thread of one shaft and then by the thread of the other shaft and shiftable from one thread to the other by said cam tappets.

2. The combination of a cylinder bearing longitudinal sets of circuit making and breaking portions, a terminal in contact with and movable lengthwise of said cylinder, means for including said cylinder and terminal in a circuit with a source of electric energy and a sounder, screw shafts connected and rotatable in opposite directions, cam tappets on said shafts near ends thereof, and an endwise movable and rockable member to move the terminal, said member actuatable first by the thread of one shaft and then by the thread of the other shaft and shiftable from one thread to the other by said cam tappets, said means to rotate the cylinder step by step, actuatable by endwise movement of said member.

3. The combination of cylinders arranged side by side and bearing longitudinal sets of circuit making and breaking portions, said cylinders being carried on a shaft, and the intermediate cylinder being fixed to said shaft and the outer cylinders loose thereon, a terminal in contact with and movable lengthwise of said cylinders, means for including said cylinders and terminal in a circuit with a source of electric energy and a sounder, ratchet disks fixed to the shaft, ratchet disks fixed to the outside cylinders and bearing lugs between their centers and peripheries, means to prevent retrograde rotation of the ratchet disks, rectilinearly movable detents, each having pawl to engage teeth of two ratchet disks and also having a pawl to engage a lug of one disk, springs to retract said detents, threaded shafts connected together for simultaneous rotation thereof in opposite direction, a rockable and endwise movable member connected with the terminal to move the latter and having portions for cooperation with the threads of the shafts, and cam tappets on the threaded shafts to shift the rockable and endwise movable member out of engagement with the thread of one shaft and into engagement with the thread of the other shaft and vice versa, and means whereby on the completion of each traverse of the endwise movable and rockable member the adjacent detent is moved forwardly.

In testimony whereof I affix my signature.

EDWARD H. SNYDER.